US 6,557,261 B1

(12) United States Patent
Buser et al.

(10) Patent No.: US 6,557,261 B1
(45) Date of Patent: May 6, 2003

(54) DUST-CAPTURING ADAPTOR FOR A SAW

(76) Inventors: John P. Buser, 837 Cornish Dr., San Diego, CA (US) 92107; Terry R. Alley, 7602 SW. 60th St., Augustas, KS (US) 67010

( * ) Notice: Subject to any disclaimer, the term of this patent is extended or adjusted under 35 U.S.C. 154(b) by 32 days.

(21) Appl. No.: 09/934,069

(22) Filed: Aug. 21, 2001

(51) Int. Cl.[7] .............................. B27B 9/00; B27G 3/00
(52) U.S. Cl. ........................... 30/124; 30/390; 30/391
(58) Field of Search ............................ 30/123, 123.3, 30/124, 388, 389, 390, 391

(56) References Cited

U.S. PATENT DOCUMENTS

| | | | | |
|---|---|---|---|---|
| 5,074,044 A | * | 12/1991 | Duncan et al. | 30/124 |
| 5,084,972 A | * | 2/1992 | Waugh | 30/124 |
| 5,125,190 A | | 6/1992 | Buser | 51/273 |
| 5,327,649 A | * | 7/1994 | Skinner | 30/124 |
| 6,167,626 B1 | * | 1/2001 | Doumani et al. | 30/124 |
| 6,219,922 B1 | * | 4/2001 | Campbell et al. | 30/124 |
| 6,318,352 B1 | * | 11/2001 | Gnazzo et al. | 30/124 |

FOREIGN PATENT DOCUMENTS

JP         6-278103      * 10/1994

* cited by examiner

Primary Examiner—Hwei-Siu Payer
(74) Attorney, Agent, or Firm—Frank G. Morkunas

(57) ABSTRACT

For a power saw, a dust-capturing device composed of two sides shields with one side shield having an exhaust duct adapted to be attached to a hose of an external vacuum and a rear panel to aid in capturing and containing dust generated by the saw's use; and the other side shield having a top and rear beveled portion disposed toward the saw to aid in capturing and containing dust generated by the saw's use. The side shields may be of a one-piece or two-piece construction and are adapted to be securely attached to a saw at or near the upper blade guard of the saw. Capturing dust with only one side shield is effective; but, use of both side shields increases the effectiveness. The attachment mechanism to attach the device to the saw may be stationary or adjustable to accommodate any adjustments necessary for varying depths of cuts.

10 Claims, 4 Drawing Sheets

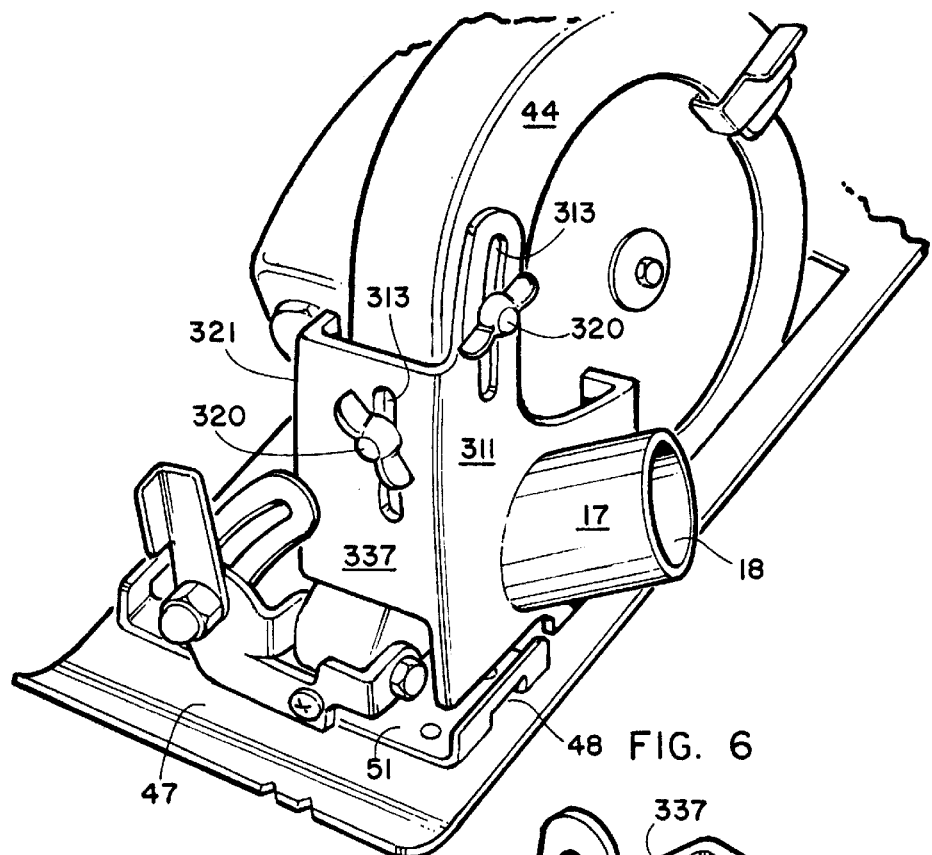
FIG. 6
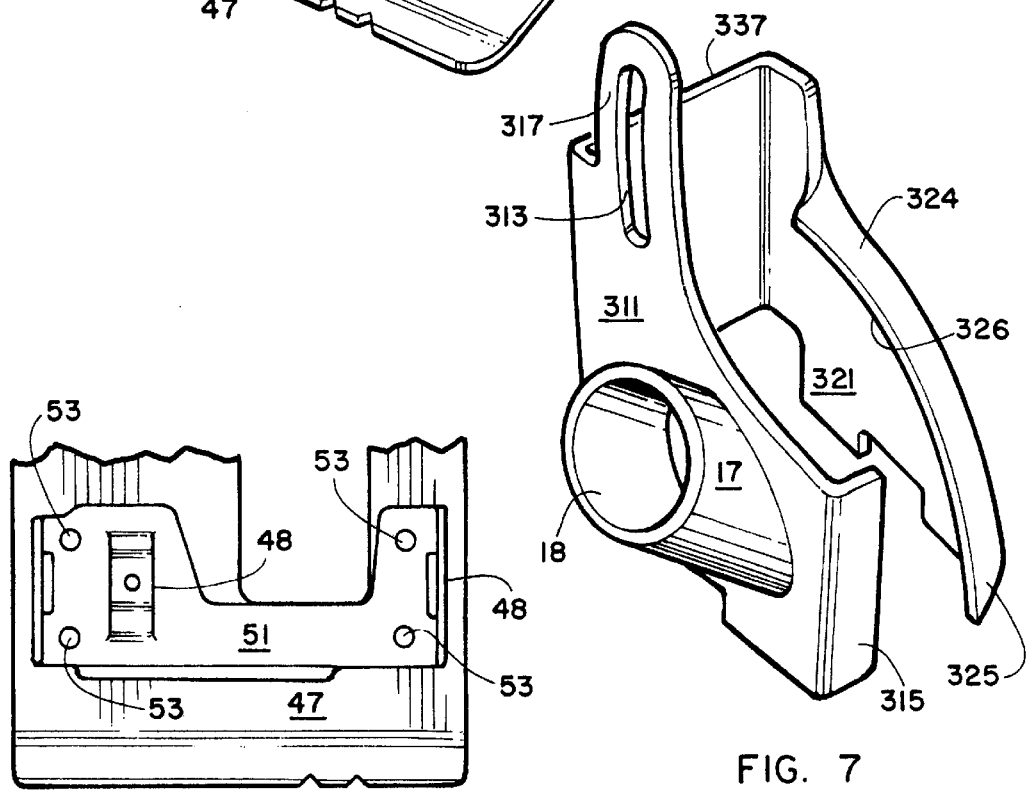
FIG. 5
FIG. 7

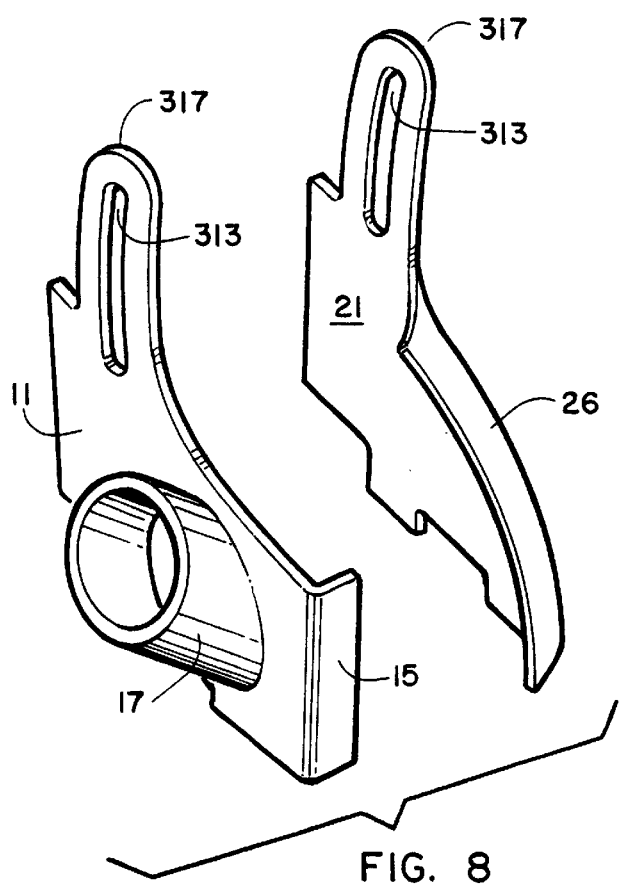
FIG. 8
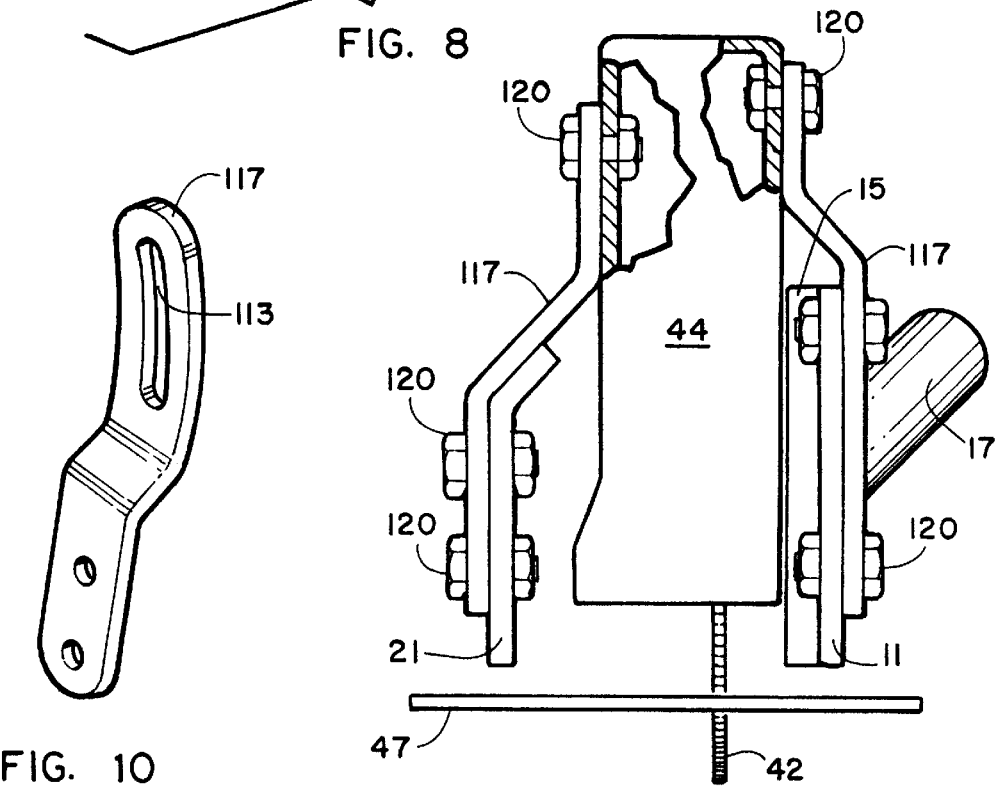
FIG. 10
FIG. 9

DUST-CAPTURING ADAPTOR FOR A SAW

BACKGROUND OF THE INVENTION

This present invention relates to an improvement in a device for capturing and displacing debris generated when using a power tool, and more particularly to a power circular saw of any size.

Power tools are the mainstay of most construction, maintenance, and repair projects; whether done commercially or by a handyman (as used herein, the term 'handyman' or 'handymen' is meant to encompass both genders and does not relate only to the male). When using a power saw, in particular, a portable power circular saw with exposed rotating blade, as the blade cuts the material upon which it is operating, the cut portions of the material are displaced therefrom in tiny particles which, for administrative clarity for this application will be referred to as dust. The rotation of the saw blade can be extremely fast, the teeth of the saw blade can be extremely hard and sharp, the dust created by cutting materials with this saw can be dense, can create an unsafe environment, and can create an unhealthy environment for the worker using the saw. The dust, if left uncaptured or undercaptured, can permeate and contaminate the workplace. The workplace may be a food processing facility, may be a health care facility, may have dust-sensitive equipment (such as a computer or delicate scientific or medical instruments), may be a home. Various governmental regulatory agencies mandate some forms of dust control under many, if not all, commercial situations.

The worker using the circular saw also is at risk, not only from using a potentially dangerous tool but also from inhaling the dust. On-lookers, passers-by, employees of the facility at which work is being performed also will inhale the dust generated by the saw. Attempts to curtail the amount of dust cast into the work space include use of a water spray in conjunction with the cutting [generally used when cutting into concrete for example]. Using a water spray, however, presents another potential hazard in conjunction with electrical power tools—that of electric shock hazards. Another attempt to curtail the amount of dust projected into the work space is the use of a bag attached, at a strategic location, to the power tool into which the dust, by rotational action, reciprocating action, or centrifugal action, is forced into the bag and collected thereat. Though useful to capture some dust, in reality, most dust generated by circular saws is not captured and is emitted into the work place nonetheless to contaminate the work place and breathable air. This has not proven to be as effective as is necessary and desirable. Moreover, dust collection bags are better suited for stationary saws, not portable saws. Stationary saws generally are larger than portable saws, heavier than portable saws, and because of these factors, a dust collection bag can be fitted onto the stationary saw and it can be expected to remain where fitted. Portable saws are not well suited for such bags. Portable saws are routinely moved about from job site to job site, and from work area to work area within a job site. By their very nature, they are moved constantly when being operated. It is the saw which is moved, not the material being cut, when a portable circular saw is being used. Such repeated movements would jostle the dust collector bag, loosen it, and ultimately displace it from the saw. As a result, portable circular saws are not well suited for such dust collectors.

Dust collection systems of which the inventors are aware are lacking in use of a dedicated vacuum for dust capture. Generally such systems operate off the vacuum generated by the cooling fan of the motor. This is of limited utility and only generates a slight discernable vacuum to aid in capturing or directing dust into a collection bag or other collection mechanism. Such systems also rely on the centrifugal forces generated, and imparted to the dust, by the rotation of the cutting blade. This, standing alone or in combination with the vacuum generated by the cooling fan is of limited utility in capturing dust. Use of a dedicated vacuum in conjunction with one or more side shields, as envisioned by the present invention is a remarkable and novel improvement over the prior art.

Another method of curtailing dust contamination is use of a respirator or face mask to filter out dust before it can be inhaled. This method, however, is suited only for the worker or workers involved in the project and not for the passers-by, on-lookers, and employees of the facility. Use of a respirator, however, increases costs associated with a project, is cumbersome, and adversely affects the mobility of the worker. As for a face mask, a good portion of the dust by-passes the face mask and is nonetheless inhaled by the worker. There is no device available which is simple to use, which is easy to manufacture, and which captures virtually all the dust emitted by a circular power saw. The present invention embodies all these features and more; all which are missing from the prior art.

The present invention can be made of virtually any materials including, but not limited to, metals, plastics, and composites. It can be adapted to fit on virtually any type and size of circular power saw. When installed, it will not interfere with the operation of the saw; but, in fact, will enhance the life of the saw and the blade by preventing dust from entering and contaminating the saw motor and by removing excess dust from the blade immediately after a cut is being made. It is crafted to initiate the capturing of dust at the initial point of dust creation; i.e., at the front of the saw at a point where the blade engages the material it is to cut—at that point, capture and extraction occur. The rear baffle and top and rear biased member prevent escape of dust from the top and the rear. The device can be used with an external vacuum system resulting in the ultimate capture and extraction of dust.

Accordingly, several objects and advantages of my invention are to:

a. capture virtually all dust emitted by a circular saw in operation;
b. enhance the useful life of a circular saw and the saw blade;
c. create a safer and healthier work environment for a user of a circular saw and for all others in or near the vicinity where such use is ongoing;
d. provide a dust capture device capable of being mounted on circular saws of virtually all shapes, sizes, and models without effecting the efficiency and effectiveness of the saw upon which the device is attached; and
e. provide an easy-to-install, easy-to-use, and economical dust capture device for circular power saws.

The foregoing has outlined some of the more pertinent objects of the present invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF SUMMARY OF THE INVENTION

The above-noted problems, among others, are overcome by the present invention. Briefly stated, the present invention contemplates a dust capturing or containing device for a portable power circular saw composed of two side shields as separate components or as a single-piece unit. One side shield has an exhaust duct adapted to be attached to a hose of an external vacuum and a rear panel to aid in capturing and containing dust generated by the saw's use. The other side shield has a top and rear beveled portion disposed toward the saw to aid in capturing and containing dust generated by the saw's use. The side shields are adapted to be securely attached to a saw at or near the upper blade guard of the saw or to the foot of the saw. The attachment mechanism to attach the device to the saw may be stationary or adjustable to accommodate any adjustments necessary for varying depths of cuts.

The foregoing has outlined the more pertinent and important features of the present invention in order that the detailed description of the invention that follows may be better understood so the present contributions to the art may be more fully appreciated. Additional features of the present invention will be described hereinafter which form the subject of the claims. It should be appreciated by those skilled in the art that the conception and the disclosed specific embodiment may be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 5 is a detailed partial view of the foot section of a typical circular saw upon which the second embodiment attaches.

FIG. 6 is a perspective view of a third embodiment of the present invention.

FIG. 7 is a detailed perspective view of the third embodiment of the present invention as viewed from the rear.

FIG. 8 is a perspective view of two side shields.

FIG. 9 is a cross-section front elevation view of a fourth embodiment of the present invention.

FIG. 10 is a detailed view of a bracket used with the fourth embodiment of the present invention.

DETAILED DESCRIPTION OF THE INVENTION

Figure 1:
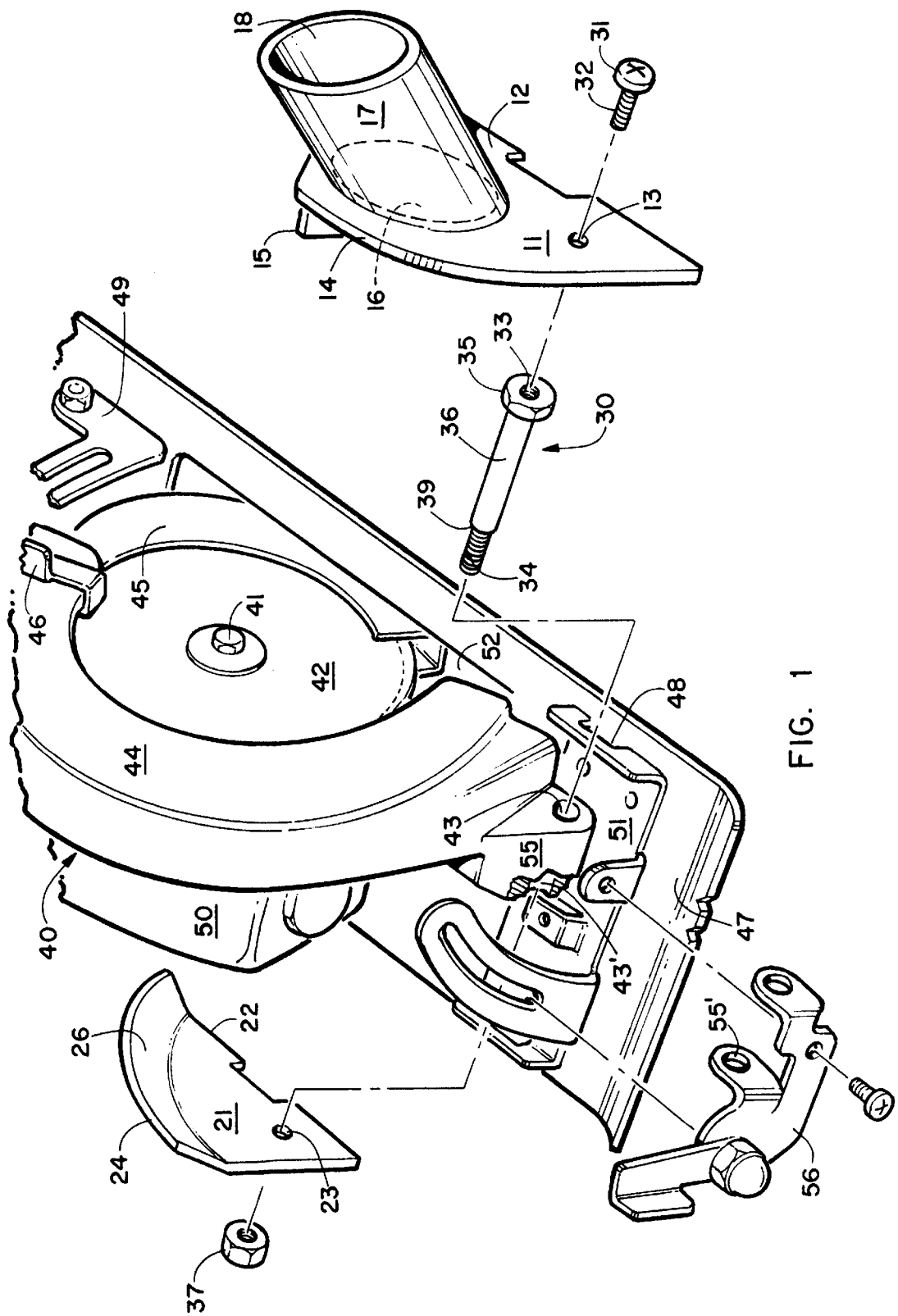
FIG. 1 is a perspective view of the preferred embodiment of the present invention.

Referring now to the drawings in detail and in particular to FIG. 1, reference characters 11 (first side shield) and 21 (second side shield) generally designates a dust-capturing saw adaptor constructed in accordance with a preferred embodiment of the present invention. First side shield 11 has a retaining aperture 13, a rear baffle or plate-like member 15 which projects outward from the first side shield 11 and toward the circular saw 40 and its blade 42. This baffle 15 is a relatively vertical or vertically-oriented member, the blade-ward extension of which begins at or near the bottom 12 of the first side shield 11 and continues upward terminating on, over, near, or at the top 14 of the first side shield 11. The function of the baffle 15, when the first side shield 11 is mounted to the saw 40 is to contain or capture dust generated through the operation of the saw 40 without encroaching upon the rotating blade 42 and, thereby, the efficiency and effectiveness of the saw 40. The first side shield 11 has an opening 16 over which an exhaust extension 17, having an exhaust port 18, is affixed. It is on this exhaust extension 17 that an external hose (not shown) from an external vacuum (not shown) is attached after the first side shield 11 is attached to the saw 40. The external vacuum draws the captured dust out and into a suitable receptacle.

The second side shield 21 also has an aperture 23 and a beveled or biased member 26, biasing saw-ward from the bottom 22 of the second side shield 21 to and over the top 24 of the second side shield 21. The function of the biased member 26, when the second side shield 21 is mounted to the saw 40, also is to contain or capture dust generated through the operation of the saw 40 without encroaching upon the rotating blade 42 and, thereby, the efficiency and effectiveness of the saw 40. The biased member 26 is tilted, curved, or angled toward the upper blade guard 44 of the saw 40.

Without the baffle 15 and/or without the biased member 26 the air flow within the cutting area of the saw, and most of the dust generated thereby, would escape to and from the rear on the first side and to and from the rear and top on the second side. The purpose of these components (baffle 15 and biased member 26) is to contain the air flow and dust, direct such flow away from those openings and back and instead, toward the shield port 16 and, because of the external vacuum, out the exhaust port 18. Use of only one side shield yields about an 85% efficiency rating in capturing dust whereas using both side shields increases that efficiency and effectiveness rating to nearly 100%.

Most upper blade guards 44 are immovable. To fully realize the functionality of the present invention, the biased member 26 should virtually, but need not, abut the outer side of the upper blade guard 44. With both sides 11, 21 so attached, a containment area is created which captures or contains the dust for ultimate, yet immediate, vacuum removal. Virtually all portable electric circular saws have an immovable upper blade guard 44, a movable lower blade guard 45, and a lift lever 46 which lifts and retracts the lower blade guard 45 into and under the upper blade guard 44 but over the saw blade 42 when the saw 40 is cutting an object. A motor 50 powers the rotation of the blade 42. The blade is held in place on the saw 40 by a suitable fastener 41; generally a bolt. This saw bolt 41 is, of course, on the opposite side of the motor 50. The saw 40 illustrated in FIG. 1 shows the exposed blade 42 to be on the left side (as viewed when using the saw 40) and the motor 50 is on the right side.

For this saw, the first side shield 11 will be attached to the left side (or blade side) of this saw 40 and the second side shield 21 will be on the right side (or motor side). For saws configured with the motor and exposed blade on opposite sides, the respective shields 11, 21 will likewise be switched but need not be. It must also be understood that the exhaust structure 16, 17, 18 on the first side shield 11 may also be on the second side shield 21 or on both side shields 11, 21.

The conventional saws described above also generally have a tilting or lifting mechanism 49 which, when utilized, permits the user to cause the upper blade guard 44, along with motor 50, lower blade guard 45, and blade 42 to drop into a large opening 52 in the foot 47 of the saw 40. This lowering or dropping permits the user to cut into deeper depths or thicker material. Such saws also have a front pivot mount 55 (upon which the saw 40 pivots up and down when lifted or lowered by the lifting mechanism 49) and, on the foot 47, a rip-guide plate 51 and a rip guide 48. Fasteners 53 such as screws and small bolts hold the rip-guide plate 51 onto the foot 47.

Such conventional saws also have a bevel mechanism 56 which, when used, permits a user to adjust the cutting angle of the saw 40 so that the saw will cut a bevel cut. The bevel mechanism 56 is mounted to the saw 40 by fasteners 53 on and through the rip-guide plate 51 and onto the foot 47 of the saw 40; and by a bevel fastener (not shown) which passes through holes 43, 43' of the pivot mount 55 and into a threaded hole 55' on the bevel mechanism 56. The saw illustrated in the figures is a Skil® saw Model 77. Similarly constructed saws include, but are not limited to Skil® saw Model 77 H and Skil® saw MAG Model. The bevel mechanism 56 for each of these named saws is fastened to the saw 40, at the pivot mount 55 through opening 43 by a suitable bevel fastener (not shown).

The preferred embodiment of the present invention is best suited for the saw models, and similarly constructed models, as described above having a bevel mechanism 56 attached to the saw 40 by way of the pivot mount 55 exposing opening 43 when the bevel fastener (not shown) for the bevel mechanism is removed therefrom. When this fastener is removed, an opening 43 through the pivot mount 55, from one side to the other side, is exposed. It is through, and with this opening 43, that the preferred embodiment of the present invention is attachable using the elongated fastener 30 next to be described.

Elongated fastener 30 has a sleeve 36, an extending threaded section 34 at one end of the sleeve 36, and a head or collar 35 at the other end. The diameter of the extending threaded section 34 is smaller than the diameter of the sleeve 36, and the diameter of the sleeve 36 is smaller than the diameter or width of the collar 35. The threaded section 34 terminates at the sleeve termination point 39. The collar 35 may be any shape round, rounded, square, square-like, rectangular, or poly-sided. As illustrated, it is hex shaped. The shape and size of the hex collar 35 on the elongated member 30 could also be the same shape and size as the nut of the fastener it replaced as this facilitates affixing the elongated member 30 to the saw 40 and minimizes the need for a variety of tools and tool sizes. The hex size on the Skil®-type saws described herein is about three-eighths of an inch to about five-eighths of an inch. The elongated fastener 30 is inserted, threaded end 34 first through the opening 43 of the pivot mount 55. The threaded end 34 passes through an opening 43' on the other side of the pivot mount 55. As stated above, the diameter of the sleeve 36 is larger than the diameter of the threaded end 34 but it is not so large as to prevent its insertion into both openings 43, 43'. The threaded end 34 passes through both openings 43, 43' and threads securely into the threaded hole 55' of the bevel mechanism 56. The length of the elongated fastener 30 for the model saws described above is between approximately 2.85 to 3.25 inches as measured from the collar 35 to the far end of the threaded end 34 with the threaded end section being approximately 0.70 to 1.00 inch long. The elongated member 30 is of sufficient length to pass through the pivot mount 55, secure into the threaded hole 55', and have sufficient length remaining at the threaded end 34 upon which to secure the second side shield 21 and at the collar 35 to secure the first side shield 11.

After the elongated fastener 30 is inserted into opening 43, the aperture 23 of the second side shield 21 is placed over the threaded end 34 and fastened thereat by a suitable fastener 37, the width or diameter of which is larger than the aperture 23 over which it rests. The aperture 13 of the first side shield 11 is then aligned with the threaded aperture 33 of the elongated fastener 30. This is followed by inserting another fastener 31 (such as, but not limited to a screw or bolt with a threaded end 32), adapted to secure to the threaded aperture 33, into the threaded aperture 33. The fastener 31 has a head end which is wider than the aperture 13 of the first side shield 11. This fastener 31 secures the first side shield 11 into place on the types of saw 40 as described above. Although a threaded aperture 33 is illustrated, this end of the elongated fastener 30 may also have a threaded extension (not shown) over which the aperture 13 of the first side shield is placed following by insertion thereon of a suitable fastening nut or nut-like fasteners (not shown).

Figure 2:
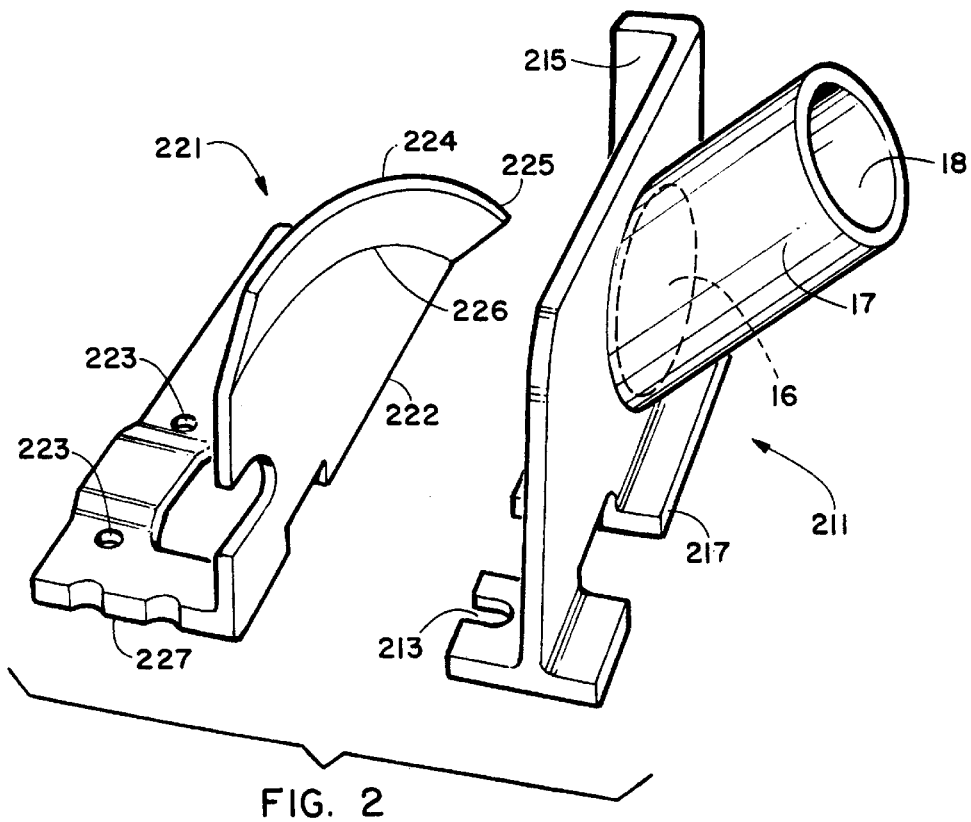
FIG. 2 is a detailed view of a second embodiment of the present invention.
Figure 3:
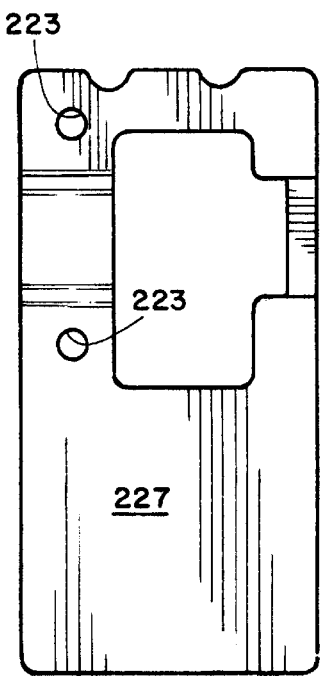
FIG. 3 is a bottom plan view of one side of the second embodiment of the present invention.
Figure 4:
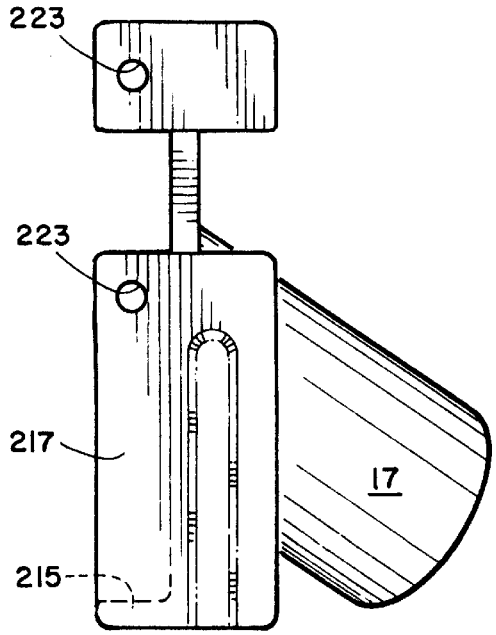
FIG. 4 is a bottom plan view of a side of another side of the second embodiment of the present invention.

For saw models not having a similarly constructed pivot mount 55, I have crafted a second embodiment of the present invention which is illustrated in FIGS. 2 through 4 (for the embodiment) and in FIG. 5 for the saw type foot 47 upon which this embodiment may attach. In this embodiment, each side shield 211, 221 has a bottom plate 217, 227, respectively, whereas the previously described embodiment did not. Like the first embodiment, the first side shield 211 to this embodiment has a rear baffle or panel 215 and an opening 16 over which an exhaust extension 17, having an exhaust port 18, is affixed; which, after attachment of the first side shield 221 to a saw 40, a hose from an external vacuum is attached. The second side shield 221 of this embodiment, like the first embodiment, also has a beveled or biased member 226, biasing saw-ward from the bottom 222 and back 225 of the second side shield 221 to and over the top 224 of the second side shield 221. The bottom plate 217, 227 of each side shield 211, 221 has slots 213 or apertures 223 which function to attach and secure each side shield 211, 221 to the foot 47 of the circular saw 40.

Circular saws 40 with rip-guide plates 51 on the foot 47 of the saw 40 are generally affixed thereto by suitable affixing fasteners 53 such as, but not limited to, screws, nuts, and bolts. The slots 213 and apertures 223 of the bottom plates 217, 227 are configured to cooperate, align with the affixing fasteners 53 of the saw 40 such that, when the affixing fasteners 53 are removed, the slots 213 or apertures 223 or both align with the holes on the rip-guide plate 51 from which the affixing fasteners were removed. The respective shields are aligned therewith and either the original affixing fasteners 53 are placed through the slots 213 or apertures 223 and secured thereat; or, if the original affixing fasteners 53 are too short to be replaced because of the additional distance caused by the bottom plates 217, 227 in between, another set of longer cooperating fasteners are used if necessary.

A third embodiment of the present invention is illustrated in FIGS. 6 through 8. This embodiment does not require that its component parts align, or are matable, with parts of the saw 40 upon which attached. Each side shield (first side shield 311 and second side shield 321) is constructed similarly as the first embodiment; i.e., first side shield 311 having a rear baffle or panel 315 and an opening 16 over which an exhaust extension 17, having an exhaust port 18, is affixed (for attaching a hose from an external vacuum) and the second side shield 321 having a beveled or biased member 326, biasing saw-ward from the bottom and back 325 of the second side shield 321 to and over the top 324 of the second side shield 321. Each side shield 311, 321 may be an independent section as were the previous two embodiments (as illustrated in FIG. 8), or the two sections may be joined as one by a front side connector 337. Either or both side shields 311, 321 may have an extension 317 with a slot 313 therein. The side shield is to be placed on the foot 47 of a saw 40 and an outline of the slot 313 is to be marked on the saw 40 (generally on the upper blade guard 44. A hole is to be drilled into the marked area, preferably at a central location. The shield is then placed on the foot of the saw and attached to the saw by a suitable fastening member 320. In the illustration of FIG. 6, a wing nut and cooperating threaded member are shown. Any type fastening members may be used including, but not limited to sheet metal screws. The extension 317 and slot 313 combination permit attaching the shields to virtually any model circular saw and further accommodating upward and downward adjustments for deeper cuts into or of materials.

The extension members may be on the sides of either or both side shields, on the fronts of either or both side shields, or, in the case of a single-piece construction of the side shield [as shown in detail in FIG. 7], on the front side connector 337.

FIGS. 9 and 10 represent yet another embodiment of the present invention. Here the mechanism for mounting the respective side shields 11, 21 (i.e., side shield illustrated in FIG. 1 which do not have bottom plates 217, 227) comprises a bracket 117 which is attached to each side shield by fasteners 120 and then attached to the upper blade guard 44. It is best to attach the brackets to the side shields first, place the side shields on the saw, using the slots 113 on the brackets 117 as guides to mark a drilling location on the upper blade guard 44, drill one or more holes in the upper blade guard 44 through which fasteners 120 will be inserted, insert fasteners 120 through the slot 113 of the bracket 117 and secure the fastener 120 to the upper blade guard 44 through the newly drilled holes therein. Any type fastener suitable for the intended purpose, including, but not limited to nuts and bolts, sheet metal screws, and the like, may be used as fasteners 120 for the bracket 117 mounting to the side shields 11, 21 and to the upper blade guard 44.

The present disclosure includes that contained in the present claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention. Accordingly, the scope of the invention should be determined not by the embodiments illustrated, but by the appended claims and their legal equivalents.

The invention claimed is:

1. A dust-capturing device for a power saw having a blade guard and a saw blade, said dust-capturing device comprising:
   (a) a first side shield attachable to one side of said blade guard and adjacent to one side of said saw blade;
   (b) a baffle member on a rear side of said first side shield extending toward said one side of said saw blade;
   (c) an exhaust member on said first side shield;
   (d) a second side shield attachable to a second side of said blade guard adjacent to a second side of said saw blade wherein a top side and a back side of said second side shield are disposed toward said saw blade.

2. The dust-capturing device as defined in claim 1 further comprising attachment means for attaching said first side shield and said second side shield to said saw.

3. The dust-capturing device as defined in claim 2 wherein said attachment means comprises an aperture on each said side shield and an elongated fastener having a threaded end, a first fastener for said threaded end, a sleeve adjacent to said threaded end, and a collar member at an opposite end of said threaded end, said collar member having receiving means for receiving a second fastener, said attachment means adapted to insert through a pivot mount of said saw exposing therethrough said threaded end over which said second side shield aperture is inserted and fastened thereat by said first fastener, said attachment means further adapted to align said receiving means with said first side shield aperture and be fastened through said first side aperture by said second fastener.

4. The dust-capturing device as defined in claim 2 wherein said attachment means comprises a bottom plate on each said side shield, each said bottom plate further having apertures adapted to align with rip-guide plate retainers on said saw and be fastened thereon.

5. The dust-capturing device as defined in claim 2 wherein said attachment means comprises an extension member with translation slot on either or both of said side shields, said translation slot adapted to receive a fastening member therethrough and through said blade guard.

6. The dust-capturing device as defined in claim 5 wherein said extension member is adjacent to said top side of either or both of said side shields.

7. The dust-capturing device as defined in claim 5 wherein said extension member is adjacent to a front side of either or both of said shields.

8. The dust-capturing device as defined in claim 5 wherein a front plate connects said first side shield to said second side shield.

9. The dust-capturing device as defined in claim 2 wherein said attachment means comprises a removable bracket attachable to each said side shield and attachable to said blade guard.

10. The dust-capturing device as defined in claim 9 wherein said removable bracket comprises a slot at an upper end of said removable bracket for adjustable placement of said removable bracket onto said blade guard.

* * * * *